Nov. 26, 1963 D. SCIAKY 3,112,391
ZEROING SYSTEM FOR ELECTRON GUN
Filed Oct. 27, 1961 5 Sheets-Sheet 1

INVENTOR.
David Sciaky,
BY Byron Hume Groen & Clement
Attys.

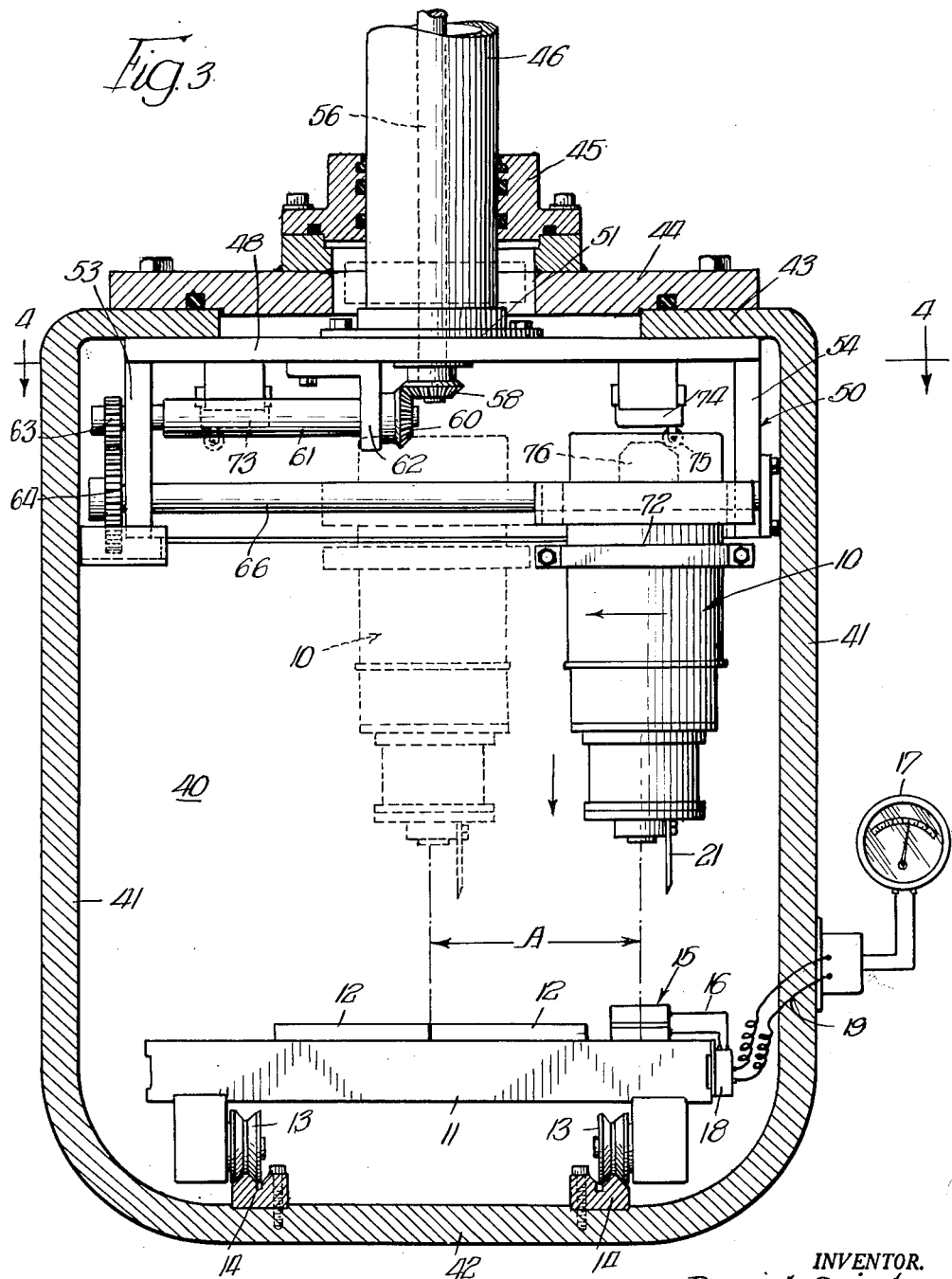

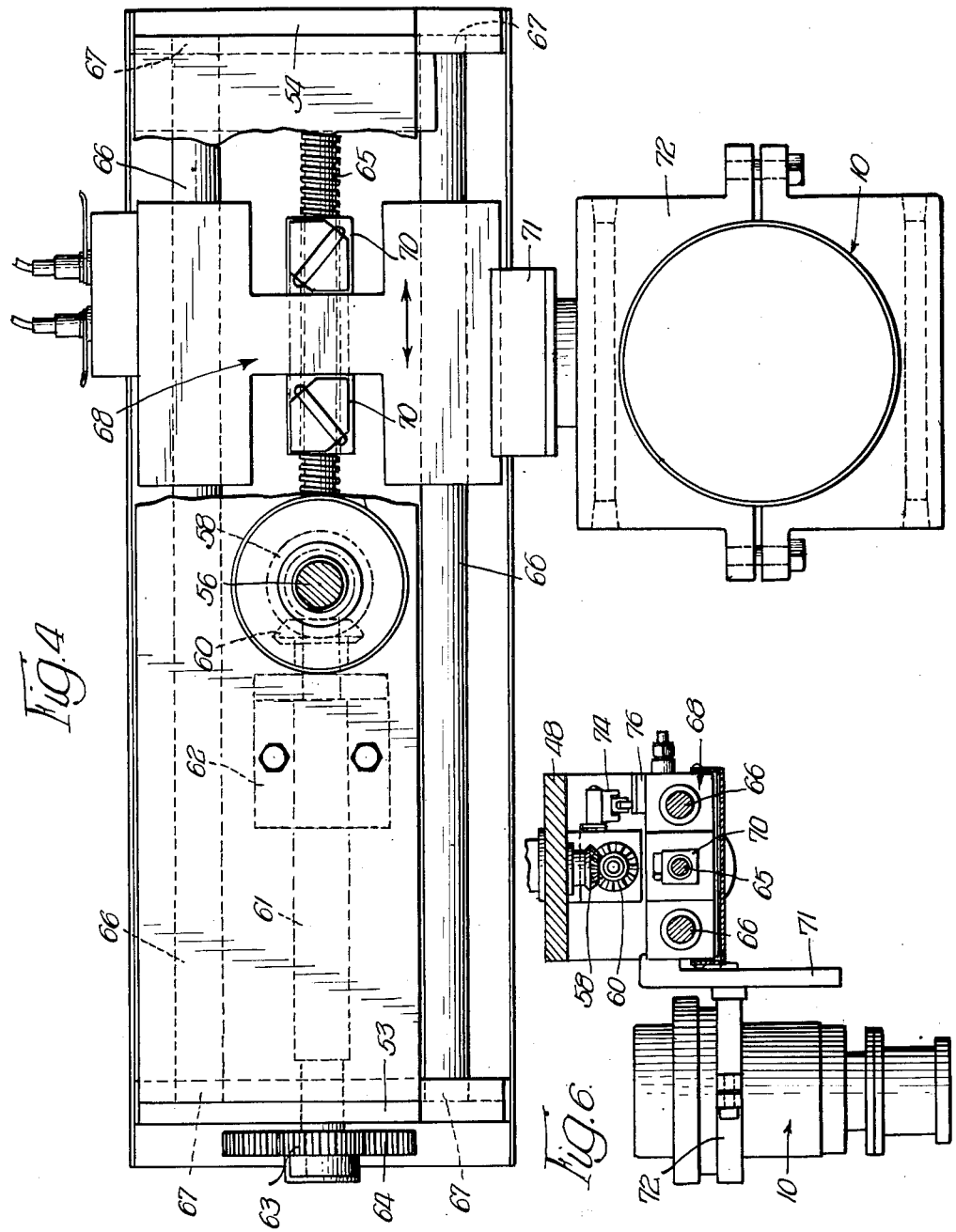

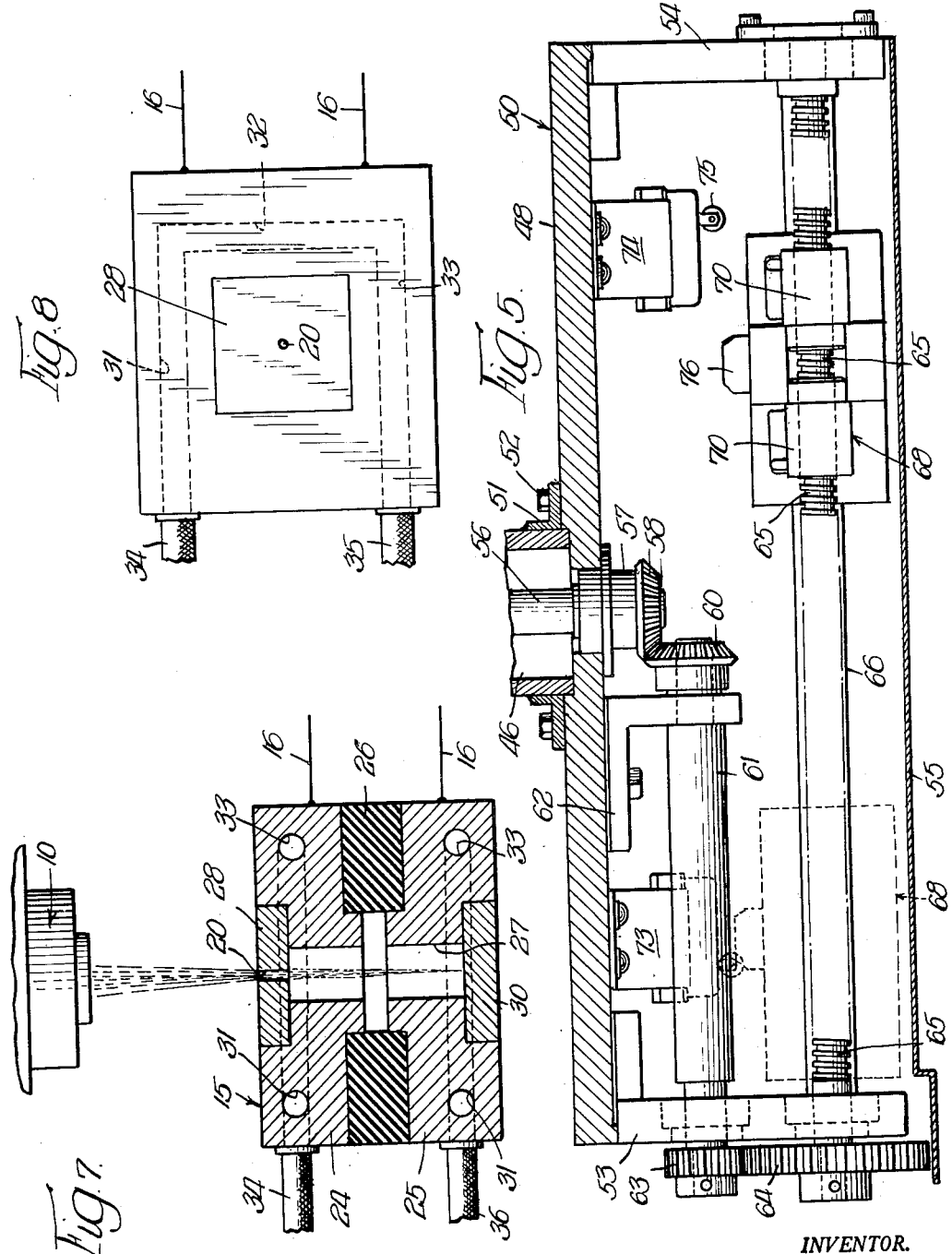

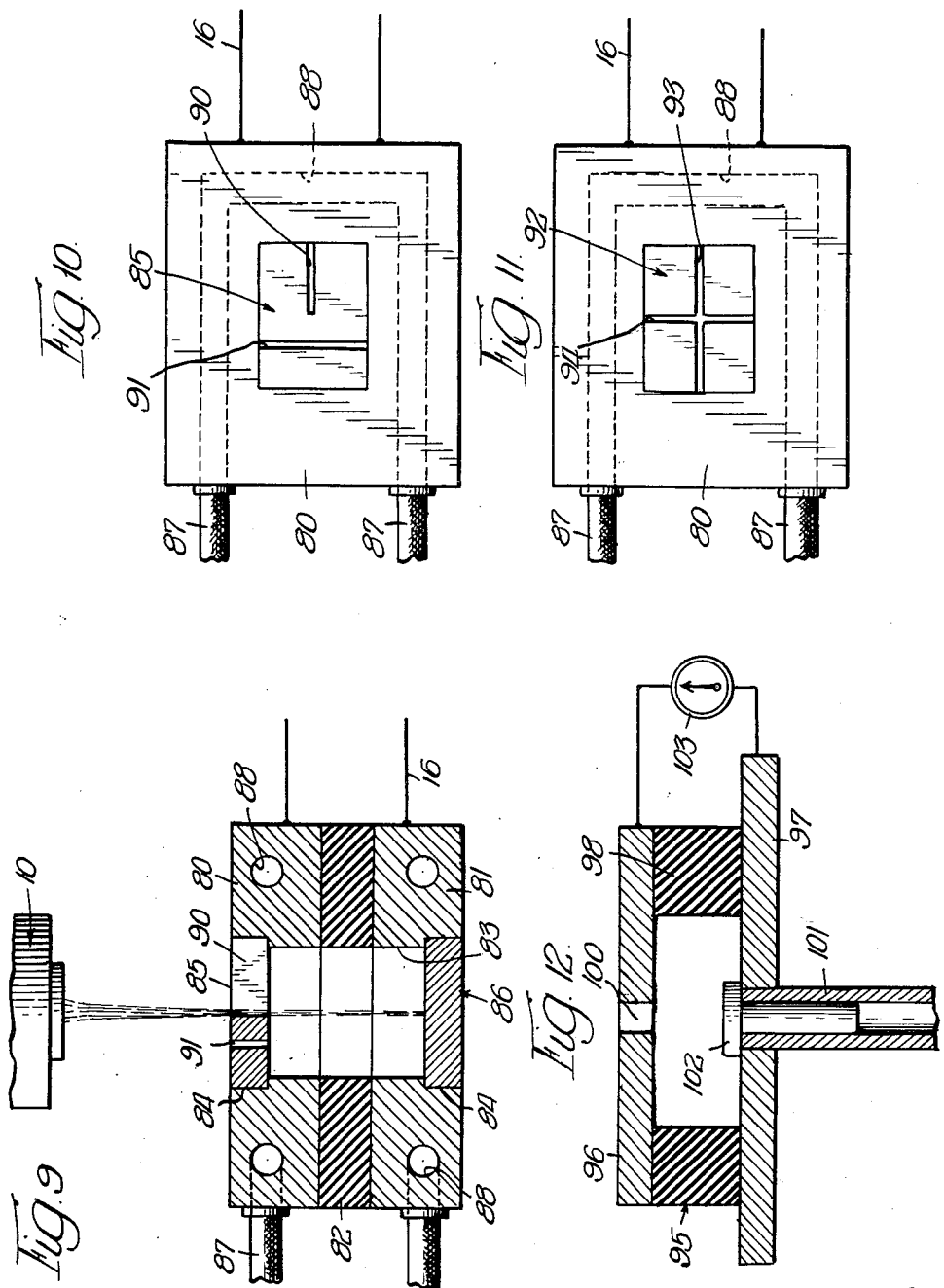

United States Patent Office 3,112,391
Patented Nov. 26, 1963

3,112,391
ZEROING SYSTEM FOR ELECTRON GUN
David Sciaky, Chicago, Ill., assignor to Welding Research, Inc., Chicago, Ill., a corporation of Illinois
Filed Oct. 27, 1961, Ser. No. 148,228
11 Claims. (Cl. 219—124)

The invention relates to welding of metals by means of electrons within a vacuum chamber, and has reference more particularly to a zeroing system and apparatus for accurately positioning the electron gun prior to welding, and for also indicating and measuring the movement of the gun during the welding operation.

The primary objective of the invention is to provide a zeroing assembly which will indicate when the greatest number of electrons from the electron gun are passing through an aperture provided by the assembly. To establish an accurate relationship between the beam of electrons and the workpieces, the carriage for the workpieces or the electron gun is first displaced and positioned over the zeroing assembly. The position of the gun with respect to the assembly is adjusted until an indication is secured that a maximum number of electrons are passing through the aperture, and then the beam is shut off. Since the X and Y distances between the zeroing aperture and the spot where the welding is to be started are known or at least can be ascertained, the carriage or the gun is displaced by these known distances. When the electron gun is started again, the beam produced by the gun will exactly hit the spot to be welded.

In connection with the foregoing, another object of the invention is to provide apparatus having location within a vacuum chamber and operable from the exterior for displacing an electron gun and for also displacing the carriage for the workpieces to be welded, the gun being displaceable along an X—X axis and the carriage along a Y—Y axis, or vice versa, and wherein the displacement of either the gun or the carriage can be accurately determined by a revolution counter or other positioning control means.

A more specific object of the invention is to provide a zeroing assembly having an aperture plate of special metal and capable of being removed, and wherein the entire assembly will have utility in determining the optimum focusing of the electron gun in addition to assisting the operator in positioning the beam so that the desired equal heating of the butting edges of the workpieces is obtained during the welding operation.

Another object is to provide a zeroing assembly primarily for use in electron welding within a vacuum chamber and which will incorporate an aperture plate and a target plate of tungsten, and wherein the plates are removable for repair or replacement, and wherein plates having apertures of a different size can be substituted to accommodate electron beams of different cross sectional area.

In the Steigerwald Patent 2,987,610, a welding process is described which consists in employing a beam of charged particles such as an electron beam or an ion beam for welding articles within an evacuated chamber. Means are disclosed for determining when the beam of charged particles is of sufficient density to penetrate the work to be welded. Since the patent does not show any means for zeroing the electron beam, the apparatus and assembly of the present invention can be employed in connection therewith for establishing an accurate relation between the electron beam and the desired spot on workpiece to be welded.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 3 is a vertical sectional view illustrating a practical embodiment of apparatus having location within a vacuum chamber for displacing an electron gun and carriage, and wherein the zeroing assembly is mounted on the carriage with the ammeter being located on the exterior of the vacuum chamber;

FIGURE 4 is a sectional view taken substantially along line 4—4 of FIGURE 3, and showing in top plan the vertically movable frame for supporting the electron gun for movement on an X—X axis;

FIGURE 5 is a front elevational view of the electron gun supporting frame as shown in FIGURE 4;

FIGURE 6 is a transverse sectional view of the gun supporting frame on a smaller scale;

FIGURE 7 is a cross sectional view of the zeroing assembly;

FIGURE 8 is a top plan view of the zeroing assembly as shown in FIGURE 7;

FIGURES 9 and 10 are sectional and top plan views respectively showing the zeroing assembly of FIGURE 1 provided with a modified form of target plate;

FIGURE 11 is a top plan view showing another modification as regards the target plate for the zeroing assembly; and FIGURE 12 is a sectional view showing a zeroing assembly for locating an electron beam exactly on the center of a pin.

Figure 1:
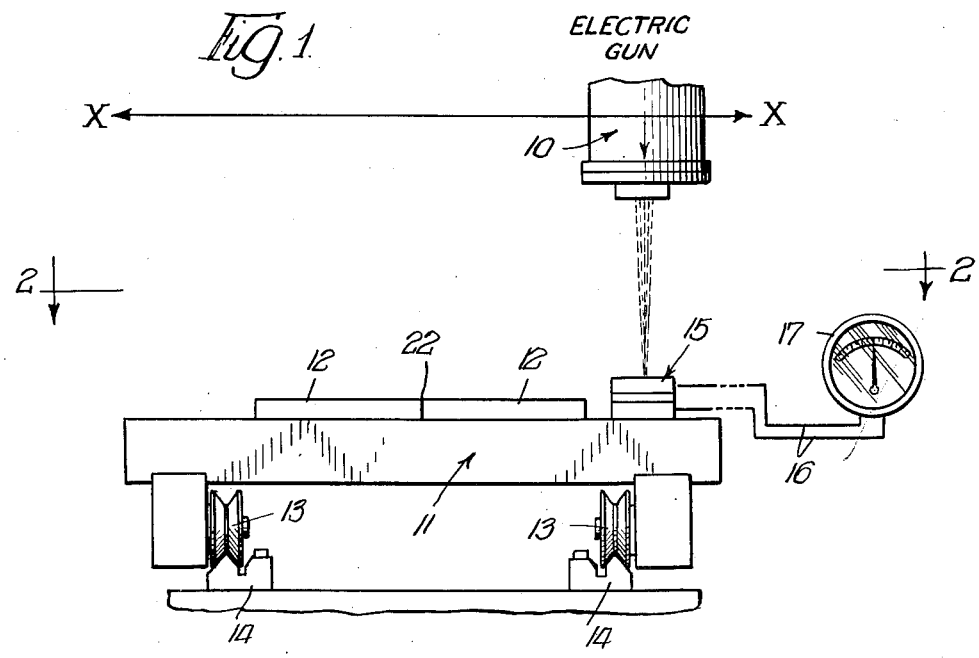
FIGURE 1 is an end elevational view of an electron gun and carriage combination, the same diagrammatically illustrating the operation of the zeroing assembly of the invention.
Figure 2:
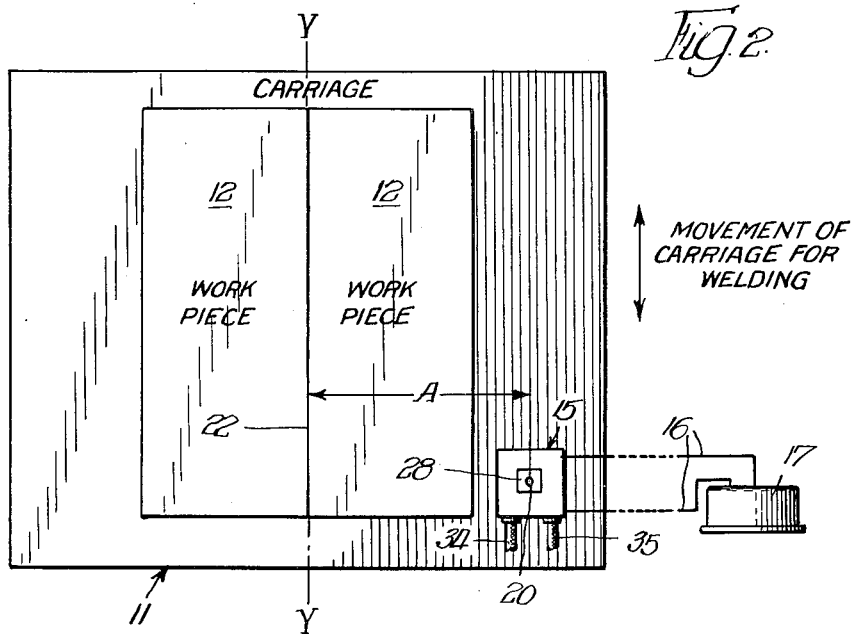
FIGURE 2 is a top plan view along line 2—2 of FIGURE 1, showing the carriage for the workpieces, and also showing the zeroing assembly attached thereto.

The present invention is diagrammatically illustrated in FIGURES 1 and 2 wherein the electron gun 10 is movable on an X—X axis, being positioned above the carriage 11 which supports the workpieces 12 to be welded. The carriage 11 is provided with rollers 13 which ride on the rails 14 disposed at right angles to the movement of the gun so that the carriage thus moves along a Y—Y axis. The zeroing assembly, indicated in its entirety by the numeral 15, is positioned on the carriage 11 to one side of the workpieces such as the right side in FIGURES 1 and 2, and the respective sections of the assembly are electrically connected by the conductors 16 to the milli-ammeter 17.

To establish an accurate relationship between the electron beam and the exact spot on the work pieces where it is desired to start the welding operation, the electron gun is first displaced in a direction towards the right, and its position is adjusted until the beam is centered on the aperture 20 provided by the assembly 15. When this condition is achieved, the greatest number of electrons will be passing through the aperture and the milliammeter 17 will show the minimum deflection. The beam is then shut off and the gun is moved to the left for a distance equal to A, which is the distance from the aperture 20 to the abutting edges 22 of the work pieces 12. This distance can be accurately measured when setting up the work pieces, and to assist the operator the gun can be visually spotted on the abutting edges by using the arrow or pointer 21 which depends from the gun 10 as shown in FIGURE 3. When the gun is again rendered operative for producing an electron beam, the said beam will be spotted precisely on the abutting edges 22 of the work pieces 12, and welding of the work pieces can then take place upon moving of the carriage 11 on the rails 14.

Since electron welding must take place in the vacuum chamber, difficulties can be encountered in precisely spotting the beam on the work pieces, and unless the beam is accurately directed on the spot or area to be welded, serious damage to the work pieces will result. For example, in butt welding as shown in FIGURES 1 and 2, the electron beam must be centered on the butting edges in order to heat the two edges to an equal extent. The zeroing assembly of the invention makes this possible as will be better understood from a description and explanation of a commercial embodiment, all as shown in FIGURES 7 and 8, and which will now be described.

The assembly 15 includes two identical sections including an upper section 24 and a base section 25. The sections may be formed of any suitable metal, although copper is preferred. The two sections are separated and suitably insulated from each other by insulating material 26 which extends around the outer edges of the assembly so as to leave the center passage 27 free and unobstructed. The top section 24 receives an insert 28 of tungsten and which is provided with the aperture 29 previously identified and through which the electrons are directed. The base section likewise retains an insert 30 also of tungsten and which provides a target for the electron beam. Since the apertured insert 28 and the target insert 30 are subjected to a bombardment by the electrons, considerable heat is generated in the assembly and which must be dissipated. For this purpose the copper sections 24 and 25 are individually cooled by flowing water through the sections. The upper section 24 is cored to provide the connecting passages 31, 32 and 33, and the cooling fluid is supplied by the flexible hose 34. The fluid is discharged from the section by the flexible hose 35. The lower section 25 is similarly cored and the flexible connections 36 provide for the flow of the cooling fluid.

A vacuum chamber 40 for electron welding, such as may employ the zeroing assembly 15, is shown in FIGURES 3 to 6, inclusive, wherein the side walls of the chamber are indicated by numeral 41, the bottom wall by 42 and the top wall by 43. The bottom wall supports the carriage 11 having the rollers 13 which ride on the rails 14. The work pieces 12 are positioned on the carriage and suitably secured in position by means not shown. The zeroing assembly 15 is also mounted on the carriage and the conductors 16 connect the two sections to the unit 18 which is in turn connected by the conductors 19 to the ammeter 17 located exteriorly of the chamber. Although the zeroing assembly is shown as mounted on the carriage, it is also possible to employ the same in a similar manner with the assembly being fixedly supported on the side walls 41 of the vacuum chamber.

The vacuum chamber is closed by the top plate 44, the said plate providing the hub section 45 through which extends the tubular supporting shaft 46. The shaft 46 is movable in a vertical direction and in a manner which maintains the vacuum chamber hermetically sealed against the entrance of air from the outside. The end of the tubular shaft within the vacuum chamber is suitably secured to the top plate 48 of the electron gun supporting frame, generally designated by numeral 50. A ring 51 welded or otherwise secured to the tubular shaft 46, and in turn secured to the top plate by the bolts 52 may be employed. In addition to the top plate 48 the supporting frame includes the side walls 53 and 54 and a bottom pan 55. The operating mechanism retained by the supporting frame is designed to produce movement of the electron gun in a direction longitudinally of the frame and in accordance with the invention said movement is effected from the exterior of the vacuum frame by rotation of the drive shaft 56, which is disposed within the tubular supporting shaft 46. The drive shaft projects through the top plate 48 of the frame 50 and is effectively sealed by the unit 57 which, however, does not interfere with the rotation of the drive shaft.

The pinion gear 58 is secured to that end of shaft 56 depending below the top wall 48, and the said gear has meshing relation with a similar pinion gear 60 fixed to the right hand end of shaft 61. The shaft 61 extends longitudinally of the supporting frame, being journalled by the angle member 62 and by the side wall 53. A gear 63 is fixed to the left hand projecting end of shaft 61, and the same has meshing relation with the gear 64 which is fixed to the drive screw 65. The drive screw 65 is journalled at respective ends in the end walls 53 and 54, and accordingly the screw extends for the length of the supporting frame. The guide rods 66 also extend the length of the supporting frame, being suitably anchored at respective ends as at 67 in the walls 53 and 54 of the frame.

The guide rods 66 support the carriage 68 and which is so mounted on the rods as to have sliding movement along their length in a back and forth direction. This reciprocating movement of the carriage 68 is effected by the drive screw 65 which operatively connects with the carriage by means of the nuts 70 having threaded relation with the drive screw. The nuts may comprise part of the carriage being integral therewith, or the nuts may have a fixed relation with the carriage. The carriage includes a depending member 71 as best shown in FIGURE 6 and the split clamping collar 72 is secured to and projects horizontally from the member 71. The member and clamping collar thus have movement with the carriage. The electron gun 10 is clamped by the clamping collar 72 and in this manner the gun is carried and positioned so as to have a location above the carriage 11 which support the work pieces to be welded.

The electron gun supporting frame 50 is movable in a vertical direction by movement of the tubular supporting shaft 46 and thus proper focusing of the electron beam on the work pieces can be obtained. For moving the electron gun longitudinally of the supporting frame, that is, on the X—X axis, as described in connection with FIGURE 1, the drive shaft 56 is rotated and through the gear mechanism the drive screw 65 is similarly rotated. Accordingly, since the carriage 68 for the electron gun has operative threaded relation with the drive screw through the nuts 70, the carriage can be reciprocated in a back and forth direction. In order to control this reciprocating movement of the carriage 68, limit switches 73 and 74 are located at respective ends of the supporting frame, being suitably secured to the top wall 48 and depending therefrom. Each limit switch provides an actuating roller such as 75 and which is located in the path of the cam 76 fixed to and having movement with the carriage 68. Movement of the carriage in a left hand direction will eventually cause the cam 76 to engage the roller of the limit switch 73. Actuation of the limit switch will either discontinue the power to the drive shaft 56 or require that the operator reverse the electrical connections, whereby movement of the carriage can take place in a right hand direction. Similar action will occur when the carriage has travelled its limit in a right hand direction, causing engagement of the cam 76 with the roller of the limit switch 74.

The pointer 21 fastened to the electron gun 10 can be utilized in measuring the distance from the assembly 15 to the joint to be welded or to a reference point on the work piece. Also, the drive means for the shaft 56 is preferably fitted with a position indicating device such as is customarily utilized on the cross feed of a lathe. Thus an alternate procedure for determining the distance A requires that the gun be first lined up with the zeroing assembly by employing the pointer and then a reading is taken of this position. The gun is then moved to the desired point of welding or to a reference point and a second reading is taken. Upon returning the gun to the zeroing assembly it is rendered operative and the electron beam is lined up with the aperture 20 by observing the point at which the minimum reading is obtained on the ammeter. The gun can then be moved the distance previously measured and the welding operation carried out.

In the modified form of assembly shown in FIGURES 9 and 10 the two identical sections, namely the top section 80 and the base section 81, are formed of any suitable metal, such as copper, and the two sections are connected as a unit with the separator 82 of insulating material being located between. The sections and separator are cored to form the central passage 83 and the openings in the sections are enlarged on the outer face of each section as at 84. An insert of tungsten is located in each opening 84 such as the target plate 85 in the top section 80 and the base plate 86 in the bottom section 81. The sections are individually cooled by the flexible hose elements 87 and the connecting passages 88 which circulate a cooling liquid through the respective sections.

The target plate 85 in this modification is provided with a slot 90 parallel with the X—X axis of the electron gun and with a second slot 91 which is parallel with the Y—Y axis. The slots do not intersect. However, in the alternative design shown in FIGURE 11 the slots do intersect. The zeroing assembly is the same as in FIGURE 9 except for the target plate such as 92. The slot 93 parallel with the X—X axis intersects the slot 94 which is at right angles thereto and thus parallel with the Y—Y axis.

In the operation of the zeroing assemblies as shown in FIGURES 10 and 11 the conductors 16 are connected to an ammeter such as 17 as previously described with respect to FIGURE 1. The electron gun is first positioned by locating the same over the target plate either 85 or 92 and then the gun is rendered operative so that the electron beam is directed onto the plate. The position of the gun is adjusted until the beam passes through the selected slot with a minimum deflection of the ammeter. This position of the gun is then noted and the same comprises the zero position for the electron beam for either the X—X axis or the Y—Y axis depending on which slot has been selected. The operation of the gun is momentarily discontinued and the gun is moved the predetermined distance to a position over the workpiece. When the gun is again rendered operative, the electron beam will be exactly spotted on the parts to be welded.

In FIGURE 12 the zeroing assembly is designed for a particular use, that of welding a pin to a tube. This requires exact spotting of the electron beam and which can be accomplished by the assembly 95 including the top metal plate 96 and the bottom metal plate 97 having the spacing ring 98 of insulating material between. The top plate 96 is apertured at 100 and the bottom plate supports the tube 101 and the pin 102 which is to be welded to the tube. The pin and tube are located directly below the aperture 100 so that the electron beam in passing through the aperture will impinge upon the pin directly below. The metal plates 96 and 97 are connected to the ammeter 103. Using a beam current of a few milliamperes, the beam is directed toward the aperture 100. If the beam misses the aperture, the full beam current will be measured by the ammeter. The gun is moved in relation to the work until a minimum reading is obtained which indicates that the electron beam is passing through the aperture and is precisely spotted on the head of the pin. A weld of this character is performed by using an electron beam of particular current value and the same is applied for a preset interval of time. The operator can thus set up the electron gun to the desired beam current required for welding the pin, set the timer to the proper interval and proceed with the welding operation.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. A zeroing assembly for use in the electron welding of metals within a vacuum chamber, the combination including a metal top section and a metal base section, insulating material located between the sections for maintaining the same in a spaced insulated relation, each section having an opening in the same and which are in approximate alignment, the said insulating material having a passage communicating with the opening respectively, a metal insert in the opening in the top section and having a through aperture leading to and parallel with the passage, a second metal insert in the opening in the base section, and conductors in electrical connection with the sections respectively.

2. A zeroing assembly for use in the electron welding of metals within a vacuum chamber, the combination including a metal top section and a metal base section, insulating material located between the sections for maintaining the same in a spaced insulated relation, each section having an opening in the same and which are in approximate alignment, the said insulating material having a passage communicating with the openings respectively, an insert of tungsten closing the opening in the top section and having an aperture through the same and in parallel alignment with the passage, a second insert of tungsten closing the opening in the base section, and conductors in electrical connection with the sections respectively.

3. A zeroing assembly for use in the electron welding of metals within a vacuum chamber as defined by claim 2, additionally including means for cooling the assembly wherein each section is provided with a cored passage extending substantially around the periphery of the section, and connections at the respective ends of each cored passage for flowing a cooling fluid through the same.

4. A zeroing assembly for use in the electron welding of metals within a vacuum chamber, the combination including a pair of plate sections formed of copper and having an opening through the same approximately centrally of the sections, a spacing member of insulating material located between the sections for maintaining the sections in spaced insulated relation, said insulating material having a passage through the same in alignment with and communicating with the openings in the sections respectively, a metal insert closing the opening in one of the sections and having a through aperture leading to and parallel with the passage, and a second metal insert closing the opening in the other section.

5. A zeroing assembly for use in the electron welding of metals within a vacuum as defined by claim 4, wherein the metal inserts are formed of tungsten, wherein each section is provided with a cored passage extending substantially around the periphery of the section, and a connection at the respective ends of each cored passage for flowing a cooling fluid through the same.

6. In a zeroing system for use in the welding of metals in a vacuum chamber, the combination with a support for retaining work pieces to be welded, of a zeroing assembly located adjacent the said work pieces, said assembly including a top section providing an aperture through which electrons are directed, and a base section providing a target piece in alignment with the aperture and which receives the electrons passing through the aperture, an ammeter electrically connected to the sections respectively, an electron gun positioned above the work pieces and above the assembly and operative for producing an electron beam, and means supporting the electron gun for reciprocating movement from a position over the assembly to a position over the work pieces and return.

7. A zeroing system for use in the welding of metals in a vacuum chamber as defined by claim 6, additionally including drive means for effecting movement of the electron gun to and from positions over the assembly and over the work pieces, said drive means being operable from the exterior of the vacuum chamber, and position indicating means having an operative connection with the said drive means.

8. A zeroing system for use in the welding of metals within a vacuum chamber as defined by claim 6, wherein the top section includes an insert of tungsten through which the aperture extends, and wherein the base section also includes an insert of tungsten providing the target piece.

9. A zeroing assembly for use in the electron welding of metals within a vacuum chamber, the combination including a top section of metal and a base section of metal spaced from said top section, a spacing element of insulating material located between the top and bottom sections, said top and bottom sections and the spacing element having an aligned passage through the same, a metal insert in the top section closing the passage, a metal insert in the bottom section and which also substantially closes the passage, and said top insert having a pair of slots therein and which extend from the top to the bottom surface of the insert and communicate with the passage, said slots being disposed at right angles to each other.

10. A zeroing assembly for use in the electron welding of metals as defined by claim 9, wherein the slots intersect each other at about the center of the insert.

11. A zeroing assembly for use in the electron welding of metals within a vacuum chamber, the combination including a top section of metal and a base section of metal spaced from the top section, a spacing element of insulating material located between the top and bottom sections, said top and bottom sections each having an opening therein in substantial vertical alignment and said spacing element comprising a ring with the center opening thereof also in vertical alignment with the openings in the sections, an ammeter in electrical connection with the sections, and said bottom section being adapted to support a workpiece by positioning the same in the opening in the bottom section, whereby an electron beam in passing through the opening in the top section will be accurately spotted on the workpiece.

References Cited in the file of this patent
UNITED STATES PATENTS

| | | |
|---|---|---|
| 1,975,997 | Whitesell | Oct. 9, 1934 |
| 2,987,610 | Steigerwald | June 6, 1961 |